MAGNETIC CORE CIRCUIT

Filed Oct. 10, 1962 5 Sheets-Sheet 1

INVENTORS
LEON S. LEVY,
A. E. WENNSTROM
WILLIAM M. COOK,
BY
AGENT.

Jan. 3, 1967 L. S. LEVY ETAL 3,296,603

MAGNETIC CORE CIRCUIT

Filed Oct. 10, 1962 5 Sheets-Sheet 2

INVENTORS.
LEON S. LEVY,
A. E. WENNSTROM
WILLIAM M. COOK,
BY
AGENT.

MAGNETIC CORE CIRCUIT

Filed Oct. 10, 1962 5 Sheets-Sheet 3

INVENTORS.
LEON S. LEVY,
A.E. WENNSTROM
WILLIAM M. COOK,
BY E. L. Oberheim
AGENT.

INVENTORS.
LEON S. LEVY,
A. E. WENNSTROM,
WILLIAM M. COOK,
BY
AGENT

Jan. 3, 1967 L. S. LEVY ETAL 3,296,603

MAGNETIC CORE CIRCUIT

Filed Oct. 10, 1962 5 Sheets-Sheet 5

INVENTORS.
LEON S. LEVY,
A.E. WENNSTRÖM,
WILLIAM M. COOK,
BY
[signature]
AGENT.

United States Patent Office 3,296,603

Patented Jan. 3, 1967

3,296,603
MAGNETIC CORE CIRCUIT

Leon S. Levy, Arthur E. Wennstrom, and William M. Cook, Los Angeles, Calif., assignors to Hughes Aircraft Company, Culver City, Calif., a corporation of Delaware Filed Oct. 10, 1962, Ser. No. 230,792
20 Claims. (Cl. 340—174)

This invention relates generally to magnetic core circuits and more particularly to such circuits involving arrays of magnetic cores as in computer memories and shift registers.

Serial computers employ information storage circuits and information transfer circuits, usually respectively referred to as memories and shift registers. The use of magnetic cores in such circuits for storing bits of information is frequently desirable because of the bistable characteristics of the cores which are inherently capable of storing information based upon a particular selected direction of core magnetization, without the need for electrical inputs to maintain the core in a selected magnetic state. However, prior art circuits, particularly shift registers, usually have a high power consumption, particularly for shift operations and, additionally, usually require several components per bit of information which is stored.

One object of this invention is to provide an improved magnetic core memory circuit or shift register.

Another object of this invention is to provide an improved magnetic core storage circuit which reduces the number of components required per bit of information which is stored.

A further object of this invention is to provide an improved magnetic core storage or memory circuit in which energy requirements are minimized for shifting information.

A specific object of this invention is to provide an improved bit oriented sequential access memory.

Further separate and combined objects of this invention are to provide a magnetic core storage circuit which may be utilized to take the place of several shift registers, which obviates the need for special amplifiers, particularly for read-write operations, which is easily mechanized in arithmetic circuits for handling operands to be used in mathematical computations, and which is conveniently mechanized in circuits permitting lengthening and/or shortening of the register.

The aforesaid and other objects and advantages are accomplished in an elementary magnetic core circuit according to one embodiment of this invention, in which a plurality of magnetic cores each have a drive winding and a read-write winding.

The magnetic cores are arranged in columns and rows. The drive windings in each column are connected in separate switch circuits which are selectively enabled in a particular sequence. Pulsing the drive windings of an enabled switch circuit of a column of cores operates to switch those cores in that column in a predetermined magnetic state to their opposite magnetic state. This predetermined magnetic state may be called the "1" state. Using this convention, after switching, all the cores are in their "0" magnetic state. The read-wire windings in each row are individually electrically polarized by means of respective diodes in series with the individual windings. The read-write windings are controlled by the switch circuits of the columns of cores and are coupled to a common input-output circuit for each row, affording parallel access to information stored in the cores of the respective columns as the respective switch circuits are enabled and pulsed. During the period of enabling of a switch circuit of a particular column of cores, and subsequent to readout, information may be restored or new information written in the cores in that particular column by suitably energizing the respective input-output circuits.

The connection of input-output circuits of the type referred to above in pairs as input to suitable arithmetic circuits, such as an adder circuit, for instance, or in other selected combinatorial groups as required by particular operations, provides a facility utilizing the elementary circuit above for performing mathematical operations. The output of such an arithmetic circuit may be coupled back into one or more of the cores which have just been read during the remaining portion of the enabling interval, to store the results of the mathematical operation.

The elementary circuit above may also be utilized in a register organization in which the information in the cores of one row of cores is transferred to corresponding cores in a second row, to thereby effectively lengthen the storage register. The sequential transfer of information from one row of cores to another row of cores is accomplished by means of a simple transfer circuit such as a flip-flop.

The use of more than one drive winding and more than one read-write winding on each core of the elementary array, together with suitable logical interconnections of drive windings on more than one core in a row and a corresponding logical interconnection of the read-write windings, in a circuit providing as many input-output circuits per row of cores as there are read-write windings per core, provides operating modes effectively shortening the register by permitting reading and restoring one core while a second core is read and new information written therein.

The use of a sequential access memory as described herein but having separate input and output circuits for each row and corresponding write and read windings for each core permits control of the insertion of information so that left shift or right shift operation may be obtained.

The aforesaid and other objects and advantages will become apparent from a study of the following specification when considered in conjunction with the accompanying drawings in which.

This invention is a form of magnetic core memory usable in digital computers. The memory circuit which is described hereinafter, among other functions, may perform the same function as a plurality of shift registers, but under favorable conditions permits a radical reduction in complexity and in power requirements, particularly for shift operations, compared with more conventional types or shift registers, such as the one or two core per bit, one transistor per bit and other types. Such conventional shift registers usually require shift power proportional to the total number of bits of storage and include a number of components per bit which may be as few as three in conventional voltage gated shift registers or as many as seven in some two-diode-per-bit types of shift registers.

Figure 1:
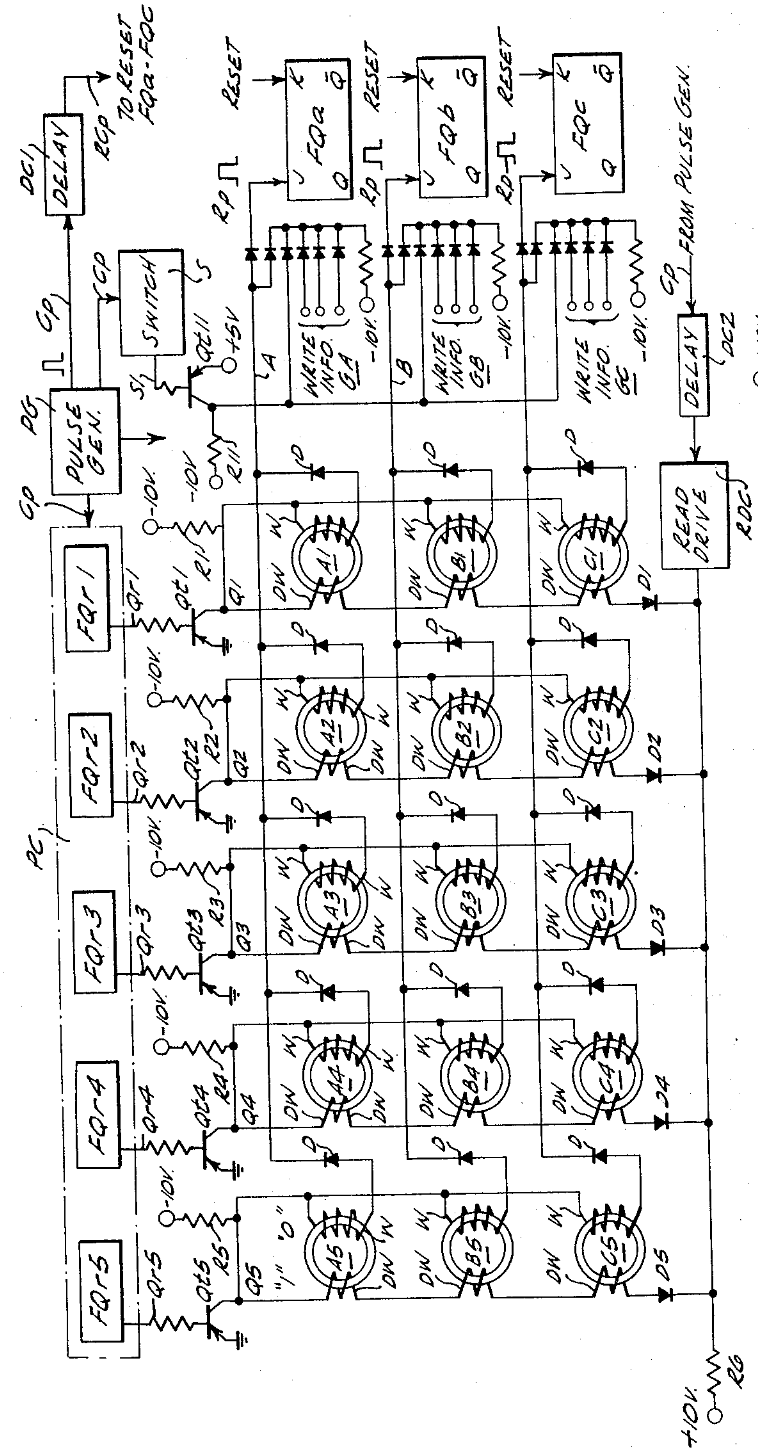
FIG. 1 is a circuit diagrammatically illustrating one embodiment of this invention.

The present invention as illustrated in FIG. 1 requires only a single core and a single diode per bit of information in addition to peripheral equipment. The arrangement is organized as a sequential access parallel memory. In this configuration energy is not required to shift information from one storage location to another. Information is shifted out as a result of pulsing of a particular core or cores when in a particular magnetic state. Energy is required only in a circuit of this configuration to record and read stored information at a single location.

In the embodiment illustrated in FIG. 1, three rows of cores are illustrated, each of which includes five cores and is five bits long. The selection of the number of bits per core row and the number of core rows is arbitrary, the numbers indicated being taken only in the interest of convenience with respect to the descriptive disclosure. The arrangement illustrated in FIG. 1 includes a group of cores, A1 through A5 comprising a first row, B1 through B5 comprising a second row and C1 through C5 comprising a third row. Each core includes a drive winding DW and a read-write winding W. The corresponding cores of the respective rows are arranged in columns. The drive windings DW of the cores in the respective columns are connected in series circuit relation in respective drive winding circuits coupled to the collectors of respective switching transistors Q*t*1 through Q*t*5, the emitters of which are grounded. The respective transistor collector circuits are additionally coupled to a suitable supply of negative voltage, say −10 volts as illustrated, through individual resistors R1 through R5. Polarizing diodes D1 through D5 are connected in series in the drive winding circuits. The cathodes of diodes D1 through D5 are commonly connected to a resistor R6 which is coupled to a supply of positive voltage, say +10 volts.

The bases of transistors Q*t*1 through Q*t*5 are controlled by a suitable pulse counter circuit which may be a stepping switch or a ring counter, or other suitable type of circuit. The arrangement herein illustrated is a conventional ring counter, the details of which are not illustrated in the interest of simplicity, and which includes respective flip flops FQ*r*1 through FQ*r*5, selected outputs of which are individually coupled through current limiting devices such as resistors to the bases of the respective switching transistors. The transistors illustrated are of the PNP variety and since their emitters are grounded require a predetermined negative voltage on their bases to cause conduction. As such, the respective flip flops FQ*r*1 through FQ*r*5, which may be of the Eccles-Jordan bistable type, may be arranged to produce a negative output voltage in that electrical state of a particular flip flop utilized to select and enable a particular switch circuit. The other voltage state of that particular terminal of the flip flop may be a higher voltage, say ground potential, or, some predetermined positive voltage with respect to ground potential. The pulse counter PC receives pulses which may be clock pulses $C_p$ from a suitable conventional pulse generator, here designated only in block form and identified by the reference character PG. With each clock pulse $C_p$, the counter is stepped one position or count to sequentially switch the transistors Q*t*1 through Q*t*5 between nonconducting and conducting conditions.

A read-drive circuit RDC is coupled to cathodes of diodes D1 through D5 and produces negative going output pulses which energize the drive windings DW of a particular column of cores in a switch circuit which is enabled by a conducting switching transistor Q*t*1–Q*t*5. The read-drive circuit RDC may be controlled by clock pulses $C_p$ coupled directly thereto, or coupled thereto through a suitable delay circuit DC2 as illustrated. Pulse stretching or other shaping of the clock pulse $C_p$ may be needed depending upon specific circuits which are employed. Such pulse shaping facilities are not shown in the interest of simplicity. The pulse output of the read-drive circuit RDC is preferably timed so that pulses occur after enabling of particular drive winding circuits by the pulse counter PC. Thus, the drive winding circuit RDC will have a delay of its own, or the pulses thereto may be delayed externally to provide pulse outputs which occur after a switching transistor Q*t*1–Q*t*5 has been switched to its conducting state to enable a drive winding circuit. Such procedures and circuits are conventional. The circuit details are not illustrated in the interests of simplicity.

The read-write windings W of the respective core circuits are coupled to the respective collector circuits of the switching transistors. Each read-write winding circuit includes in series therein a circuit polarizing diode D. The cathodes of the diodes D are commonly coupled together forming an input-output circuit for the read-write windings of each of the rows of cores. The respective input-output circuits are designated A, B and C.

Figure 2:
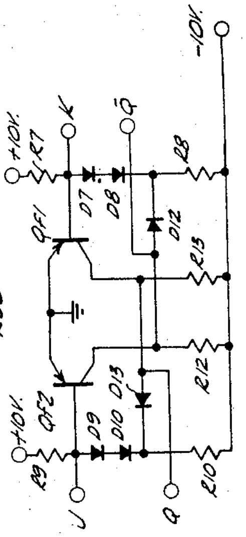
FIG. 2 is a circuit illustrating a type of flip flop usable with the circuit of FIG. 1.

Provision is illustrated in FIG. 1 for storing the output of particular cores of the respective rows. The storage facility in each case may be a conventional Eccles-Jordan type of flip flop. These have been designated FQ*a*, FQ*b* and FQ*c*, each of which includes two input circuits designated J and K, respectively, and two output circuits designated Q and $\overline{Q}$, respectively, in keeping with conventional notation for such devices. The details of a suitable type flip flop circuit are illustrated in FIG. 2, which will be discussed at a later point. This circuit is presented to facilitate discussion of certain specific functional aspects which follow.

Information to be inserted into the magnetic core circuit is gated to the respective input-output circuits by respective gates GA, GB and GC which are conventional "and" gates, incorporating, in each instance, one or more write information input circuits which are diode coupled to respective pull down resistors in turn coupled to a suitable source of negative voltage, say −10 volts. The outputs of these gate circuits are respectively coupled by means of individual diodes to the input-output circuits A, B and C and, additionally, each includes diode coupling to a gate enabling circuit including the collector of a gate enabling transistor Q*t*11 which operates to disable all of the gates during a first portion of each time interval and thereafter to enable the respective gates during the remainder of each time interval. Transistor Q*t*11 has an emitter circuit connected to a suitable positive voltage supply, say +5 volts. The collector circuit is also coupled through a suitable resistor R11 to a supply of negative voltage, say −10 volts.

The base of transistor Q*t*11 is controlled by a switch, generally designated S, which may be a monostable multivibrator, which is driven by the clock pulses $C_p$ and which produces an output signal which switches between two voltage states during each time interval. When transistor Q*t*11 is conducting the outputs of the respective gates GA through GC are coupled to +5 volts to thereby disable the gates. The switch S produces a signal which switches between two voltage levels and which is at the lower voltage level during the period when the cores of the respective columns are being read to cause conduction of the transistor Q*t*11 to disable the gates. When the core reading interval is ended the switch S switches to its other voltage state cutting off the transistor Q*t*11. Gate enabling voltage is now coupled to the respective gates which enables the gates in the absence of a read out signal on the respective input-output circuits.

Figure 3:
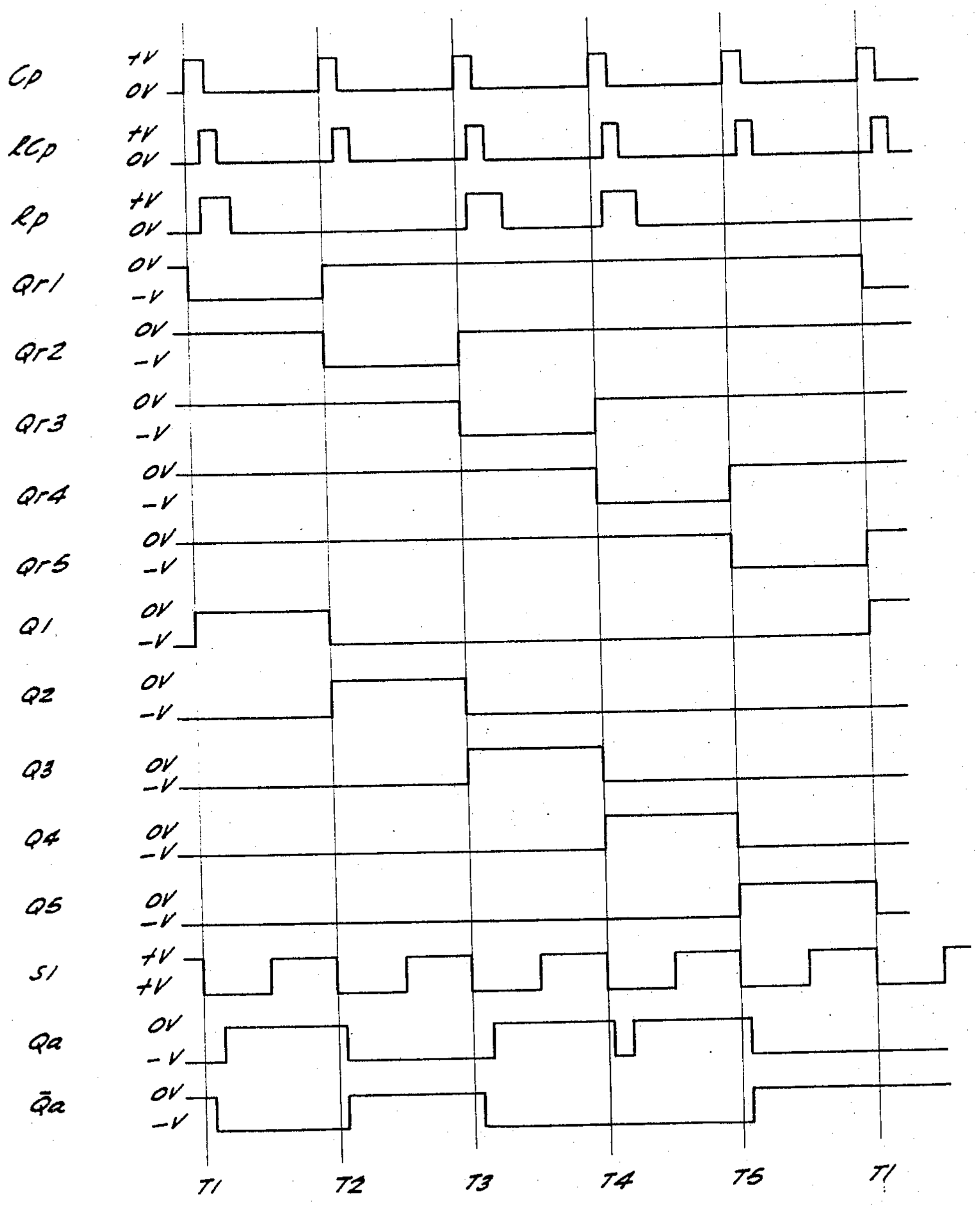
FIG. 3 is a signal timing diagram.

The operation of this circuit will be better understood by reference to FIG. 3 which shows the signal timing. The signals shown are idealized and do not necessarily represent actual signal shapes. Exact voltages are not given. The signal polarities illustrated herein are arbitrarily chosen in correspondence with the polarities of the circuits illustrated in FIG. 1. It will be appreciated that for different circuit arrangements the signals illustrated in FIG. 3 may be inverted. The clock pulse $C_p$ is illustrated as a rectangular wave type of voltage pulse which swings between zero voltage and some positive voltage. The time duration of this signal is measured in fractions of a microsecond for a particular embodiment of this invention. Each of the flip flops FQ*a* through FQ*c* has a reset signal coupled to its K input terminal which is utilized to reset the flip flop. This signal is herein illustrated as a reset clock pulse $RC_p$ of essentially the same time duration as the clock pulse $C_p$ but delayed and which may be produced by any suitable clock pulse energized delay circuit or other suitable circuit, herein designated as a block DC1. The output circuit in which the reset clock pulse $RC_p$ is produced is indicated as being connected to all of the reset terminals, K, of the storage flip flops.

A signal $R_p$ which is the readout signal appearing in the various input-output circuits A, B and C, is shown as a signal of substantially the same incidence in time as the reset clock pulse $RC_p$ but of longer duration. In one practical embodiment of this invention the reset signal $RC_p$ is approximately of 0.5 microsecond duration.

The occurrence of a signal $R_p$ in any output circuit depends upon the setting of a particular core. If a core which is pulsed by the drive winding occupies a magnetic state opposite to that produced by pulsing of the drive winding, that particular core will be switched and will produce an output signal $R_p$. The signal $R_p$ as illustrated, arbitrarily denotes switching of respective cores A1, A3 and A4 during particular times T1, T3 and T4, as illustrated in FIG. 3 which are determined by clock pulse $C_p$ repetitions, as illustrated. It will be seen from FIG. 3 that the reset clock pulse $RC_p$ and the read pulse $R_p$ occur substantially simultaneously and therefore appear substantially simultaneously on the inputs to the respective storage flip flops. The presence of the read pulse $R_p$, however, results in switching of a flip flop to its Q or "1" electrical state since the reset clock pulse $RC_p$ terminates earlier. Thus, if it is assumed that pulsing of a drive winding is in such a sense as to switch the associated core to its "0" magnetic state, a read pulse $R_p$ is produced each time a core set in its "1" representing magnetic state is pulsed, and, consequently, a "1" is inserted into the associated storage flip flop, in which case the Q output terminal of that flip flop will be in its "1" representing voltage state.

Inasmuch as the respective switching transistors Q*t*1 through Q*t*5, for the circuit arrangement illustrated, require negative switching voltage, the voltage states of the Q output terminals of the flip flops FQ*r*1 through FQ*r*5 are denoted in FIG. 3 as swinging between some negative voltage and zero volts. Thus, with the selection of column 1 of the cores the output Q*r*1 of flip flop FQ*r*1 of the pulse counter is at the lower of its two voltage states, that is, at a negative voltage as illustrated so that transistor Q*t*1 conducts. During this interval all the outputs Q*r*2–Q*r*5 of the other flip flops FQ*r*2 through FQ*r*5 are at zero volts. In time interval T2, which begins with the next clock pulse $C_p$ the flip flop FQ*r*1 is switched off. Its output Q*r*1 goes to the higher of its two voltage states. The flip flop FQ*r*2 is switched on so that its output Q*r*2 goes negative. Consequently, switching transistor Q*t*2 now conducts.

If during time interval T1, the core A1 is in its "1" representing magnetic state the occurrence of a pulse from the read-drive circuit RDC results in the switching of the core producing a read pulse $R_p$ in the input-output circuit A as indicated in FIG. 3. This pulse results in switching of the flip flop FQ*a* to its "1" representing electrical state in which the voltage Q*a* is high.

Time interval T2 begins with the next clock pulse. Assuming that core A2 is in its "0" electrical state the occurence of a read-drive pulse from the read-drive circuit RDC merely drives the core A2 in a direction in which it is already set. The net result is that insufficient energy is coupled into the input-output circuit A to result in switching of the flip flop FQ*a*. Consequently, the flip flop FQ*a* is now reset to its "0" representing electrical state by the reset clock pulse $RC_p$. If cores A3 and A4 are in their "1" representing magnetic states flip flop FQ*a*, as shown by voltages Q*a* and $\overline{Q}a$, is switched to its "1" electrical state in time interval T3 and effectively remains in this state through time interval T4, although during the interval of pulse $RC_p$ both outputs may be low, as shown. The voltages Q*a* and $\overline{Q}a$ represent the outputs of only the flip flop FQ*a*. The voltage outputs (not shown) of the other flip flops are similar in character and will vary depending upon the individual core settings. The voltages Q1 through Q5 characteristically denote the respective collector circuit voltages of the switching transistors Q*t*1 through Q*t*5.

As earlier noted, the switch S produces a signal S1 which switches the transistor Q*t*11 to its conducting state during the portion of each time interval in which the read pulses $R_p$ are produced and then switches the transistor Q*t*11 to its nonconducting state, in which state it remains until the end of the time interval. The signal S1 is illustrated in FIG. 3 and is typically shown as a rectangular wave voltage which is at the lower of its two voltage levels during half of each time interval and at its higher voltage level during the remaining half of each time interval. The time duration of the two sections of this signal is arbitrarily chosen in this instance. The lower of the two voltage states is shown occurring with the incidence of each clock pulse $C_p$ and extending a sufficient period of time to bracket the read pulse $R_p$. It is during this lower voltage interval of the signal S1 that the respective gates GA through GC are disabled by coupling of the collector circuit voltage of the transistor Q*t*11 to the respective gates. The read pulse $R_p$, which is a positive going voltage for the purposes herein described, is therefore gated to the inputs of the respective flip flops.

With removal of the gate disabling voltage and in the absence of a read pulse $R_p$ in the output circuit, a write signal may be gated to a particular core from an associated gate. Assume again that switching transistor Q*t*1 is conducting. This is interval T1. During the interval T1, therefore, the read-write winding circuits of the cores A1, B1 and C1 are coupled to ground. Assuming that write "1" information exists on the write information terminals of any one of the gates, when transistor Q*t*11 is cut off the input-output circuit associated therewith is coupled between ground and −10 volts in a circuit including the switching transistor Q*t*1, the associated read-write winding W, the series connected diode D, the coupling diode coupling the particular input-output circuit to the input terminal of the gate and the pull down resistor of that particular gate.

The current flow is in such a direction as to result in switching of the core from its "0" representing electrical state to its "1" representing electrical state. If a "0" were to be written in the core, one or more of the write information terminals on the input gate would have been in the higher of its two voltage states so that the gate would have been disabled. As a consequence the core would have remained in its "0" representing electrical state.

Thus, it will be seen that information may be sequentially read from the columns of cores and stored in the respective storage flip flops FQ*a* through FQ*c* and that during the interval of enabling of a particular column of cores information may be rewritten into the same cores which have just been read. The cores may be read and restored or the cores may be read and new information stored depending upon the mode of operation that is desired.

Although conventional two input circuit types of Eccles-Jordan flip flops are useable in this invention, reference is made to FIG. 2 for a particular type of circuit which may be employed herein. The circuit illustrated includes a pair of transistors $Qf1$ and $Qf2$ which are connected in grounded emitter configuration and employs diode cross coupling between the collectors and bases, including diodes D7 and D8 connected in a first voltage divider circuit with resistors R7 and R8 and including diodes D9 and D10 in a second voltage divider circuit with resistors R9 and R10. The respective voltage divider circuits are connected between a suitable supply of positive voltage, say +10 volts, and a negative voltage, say −10 volts. The collector circuits of the respective transistors are connected to the −10 volt voltage supply through respective resistors R13 and R12. Isolating diodes D12 and D13 isolate the flip-flop outputs. The output terminals Q and $\overline{Q}$ are coupled to the collectors of transistors $Qf1$ and $Qf2$ respectively. The J and K input terminals of this flip flop are coupled to the bases of transistors $Qf2$ and $Qf1$, respectively.

The voltage dividers are normally so set as to provide negative voltages at the bases of the respective transistors, Q1 and $Qf2$, tending to drive both of the transistors to conduction. As described in connection with FIG. 1 the read pulses $R_p$ are applied to the J input terminals and the reset pulses are applied to the K input terminals. Thus, during a particular time interval that a read pulse exists both of the transistors $Qf1$ and $Qf2$ are being driven to nonconducting conditions, in which the voltages at terminals Q and $\overline{Q}$ are momentarily low. However, the longer duration read pulse $R_p$ holds off the transistor $Qf2$ which couples a negative voltage to the base of transistor $Qf1$ forcing transistor $Qf1$ to conduct. The collector circuit of transistor $Qf1$ is therefore coupled to ground potential and the output terminal Q is approximately at ground potential. The output terminal $\overline{Q}$ is at some negative voltage. If in the next interval there is no read pulse $R_p$ the reset clock pulse $RC_p$ appearing on the terminal K switches off transistor $Qf1$ and the cross-coupling switches on transistor $Qf2$ so that the output terminal Q now swings to some negative potential and the output terminal $\overline{Q}$ swings toward ground potential.

Figure 4:
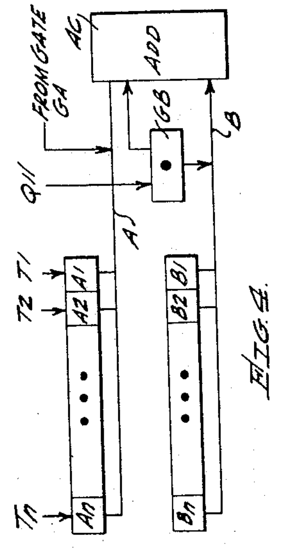

FIG. 4 illustrates a mechanization of an arithmetic circuit of the type shown in FIG. 1 employing two rows of cores in a sequential access magnetic core circuit forming the functional equivalent of two shift registers. This arrangement includes a first row of cores A1 through A*n* and a second row of cores B1 through B*n*, which are shown only in block form in the interest of simplicity. The output circuits A and B of these respective cores are coupled as inputs to a suitable type of arithmetic circuit, here indicated as an adder circuit generally designated AC. Such circuit may be a full adder or a half adder and may be of the type illustrated in a patent to E. C. Nelson, Patent No. 2,803,401, or it may be any other suitable type of adder circuit. The result of the addition of the two binary numbers *a* and *b* is applied as input to "and" gate GB of the type of FIG. 1, having an output circuit coupled as input to input-output circuit B. Signal Q11 which is the output voltage of the collector circuit of switching transistor $Qt11$, as described in connection with FIGS. 1 and 3, is applied to a second input terminal of "and" gate GB. The adder circuit AC may include flip flops FQ*a* and FQ*b* as inputs or may include other suitable temporary storage facilities for the input numbers. The adder circuit may also include temporary storage of the output signal as required. Enabling of gate GB when the signal Q11 is at the lower of its two voltage states results in gating of the output of the arithmetic circuit to that particular core B1 through B*n* which is presently enabled. Thus, in time interval T1 cores A1 and B1 are read. Arithmetic operations are performed on the output signals from the respective cores and the result is inserted in core B1. In time interval T2 the cores A2 and B2 are read and the results of the arithmetic operation are written in the core B2, etc. Thus, the sequential access magnetic core circuit of FIG. 1 is conveniently applied in the performance of arithmetic operations in a serial type of digital computer. However, unlike conventional shift registers the operands are read from a particular column of cores in a given interval of time, operated upon and reinserted into the same cores during that particular interval of time. Although the output of the adder circuit is coupled only to the input output circuit B it may be coupled to circuit A instead. The input connection from gate GA to circuit A is shown but the gate is not shown to simplify the illustration.

Figure 5:
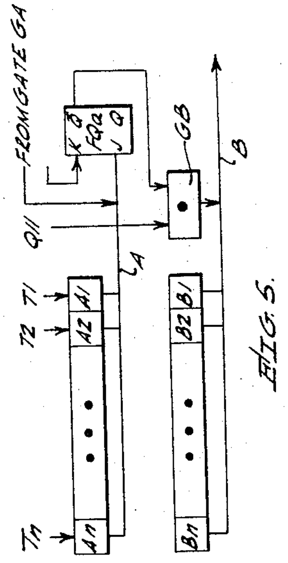
FIGS. 4 and 5 are block diagrams illustrating particular organizations of a circuit of the type of FIG. 1 and embodying the principles of this invention.

FIG. 5 is a block diagram illustrating a mechanization of two rows of cores of the type of FIG. 1, forming the functional equivalent of shift registers, in a circuit for lengthening a shift register. In this arrangement output circuits A and B are coupled respectively as input to a flip flop FQ*a* or other suitable transfer circuit, and to the output of "and" gate GB. Enabling of "and" gate GB is controlled by the enabling circuit including the switching transistor $Qt11$. As before, the K input terminal of flip flop FQ*a* is controlled by the reset clock pulse $RC_p$. The $\overline{Q}$ output terminal of flip flop FQ*a* is coupled as input to "and" gate GB. Other input circuits may be coupled to "and" gate GB as required by a particular operation. In this instance, however, the circuit is arranged merely to transfer information from the cores A1 through A*n* to corresponding cores B1 through B*n*.

As will be recalled from the description of FIG. 1 the write input voltage on a particular input-output circuit is of a polarity opposite to that of the output voltage represented in read pulse $R_p$. Since for the conditions chosen herein the read pulse is positive the write pulse is therefore negative. With reference to FIG. 2 it will be recalled that the $\overline{Q}$ output terminal goes low at any time a read pulse $R_p$ is applied to the J input terminal. Thus, the $\overline{Q}$ output circuit of the flip flop is coupled as input to the "and" gate GB to pull down this input terminal of the "and" gate. In operation the write pulse $R_p$ switches the flip flop so that the $\overline{Q}$ output terminal goes from its high voltage state to its lower voltage state. Thus, one input terminal of the "and" gate is at gate enabling potential. When the collector voltage Q11 goes to the lower of its two voltage states the other terminal of "and" gate GB is enabled and write information may be gated to the input-output circuit B. During the interval T1 the core A1 is read and this information is shifted to the core B1. Thereafter, the core A2 is read and the information shifted to the core B2, etc. By this expedient the register sections A1 through A*n* and B1 through B*n* are connected in series and the register is effectively lengthened. As in the case of FIG. 4 the circuit coupling gate GA to circuit A is shown but the gate GA is not shown to simplify the illustration.

Figure 6:
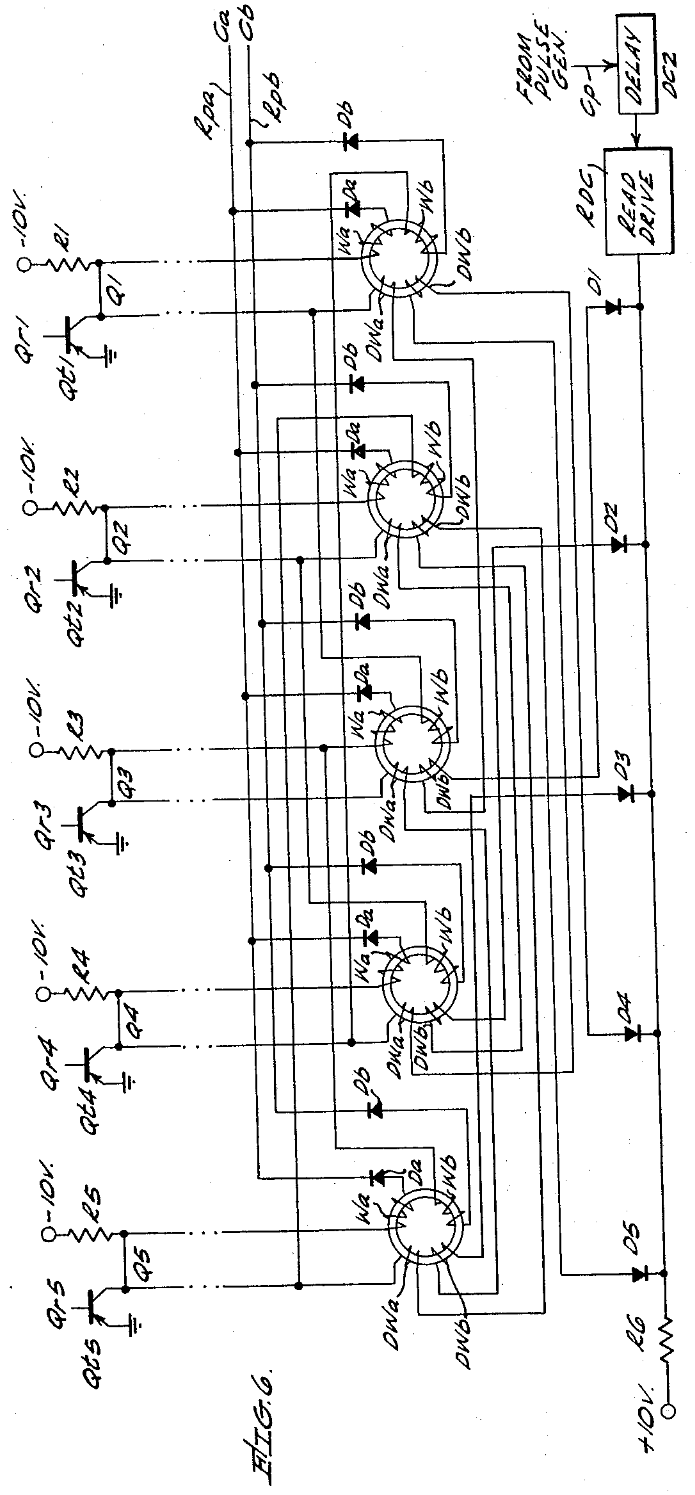
FIG. 6 is a modification of the invention illustrated in FIG. 1, permitting access to more than one column of cores in a given time interval.

Shortening of a register may be accomplished in an arrangement generally illustrated in FIG. 6 which shows a modification of the magnetic cores and the magnetic core circuits. In this circuit parts corresponding to those illustrated in FIG. 1 bear like reference characters. In the interest of simplicity only the core row C1 through C5 is herein mechanized. In FIG. 6 each of the cores includes two drive windings. These are designated DW*a* and DW*b*. Each of the cores also includes two read-write windings which are respectively designated W*a* and W*b*. The respective read-write winding polarizing diodes are designated D*a* and D*b*, the cathodes of which are coupled into respective output circuits, here designated C*a* and C*b*. Switching transistors $Qt1$ through $Qt5$ again selectively enable the drive winding circuits under the control of signals $Qr1$ through $Qr5$ derived from the respective pulse counter flip flops as described in connection with FIG. 1.

The circuit connections provided herein permit reading two cores simultaneously to produce read pulses $R_{pa}$ and $R_{pb}$ in the respective output circuits C*a* and C*b* from two selected cores of a particular core row. To this end, drive winding DW*a* of core C1 is connected in series with drive winding DW*b* of core C3. Thus, whenever switching transistor Q*t*1 is switched to its conducting state the cores C1 and C3 are pulsed simultaneously. Depending upon the magnetic state of the cores output signals will appear in one or both of the input-output circuits C*a*, C*b*. The read-write windings of these cores are also connected to permit setting of these cores during the time interval T1 to a selected one of their two magnetic states. To this end the winding W*a* of the core C1 and the winding W*b* of the core C3 are connected to the collector of the switching transistor Q*t*1. Restoring of the cores may be had as desired. For instance, the core C1 may be read and restored, in which case the gate associated with input circuit C*a* may be controlled to result in writing a "0" or a "1" in the core C1, depending upon whether or not the core was initially in its "0" or "1" representing magnetic state. The gate associated with the input-output circuit C*b* may be controlled to write a "0" or a "1," depending upon the information that is desired to be stored in core C3 at that particular time. These gates are not illustrated in the interest of simplicity, however, two gates, one for circuit C*a* and one for circuit C*b*, such as the gate GC, will now be employed for a row of cores which is wired as illustrated herein.

To continue with the circuit connections the winding DW*a* of core C2 is connected in series with the winding DW*b* of the core C4 and the winding DW*a* of the core C3 is connected in series with the winding DW*b* of the core C5. Winding DW*a* of core C4 is connected in series with winding DW*b* of core C1, and winding DW*a* of core C5 is connected in series with winding DW*b* of core C2 to complete the drive winding circuits for the respective cores. The pattern of the connection of the read-write windings follows that outlined in connection with cores C1 and C3 and has the same correspondence to the drive winding connections as described in connection with cores C1 and C3.

It will be evident that this circuit arrangement provides effective shortening of the length of the register permitting access to more than one core at a time, in this case two, during particular clock pulse intervals for the purpose of both reading and writing information in the respective cores.

Figure 7:
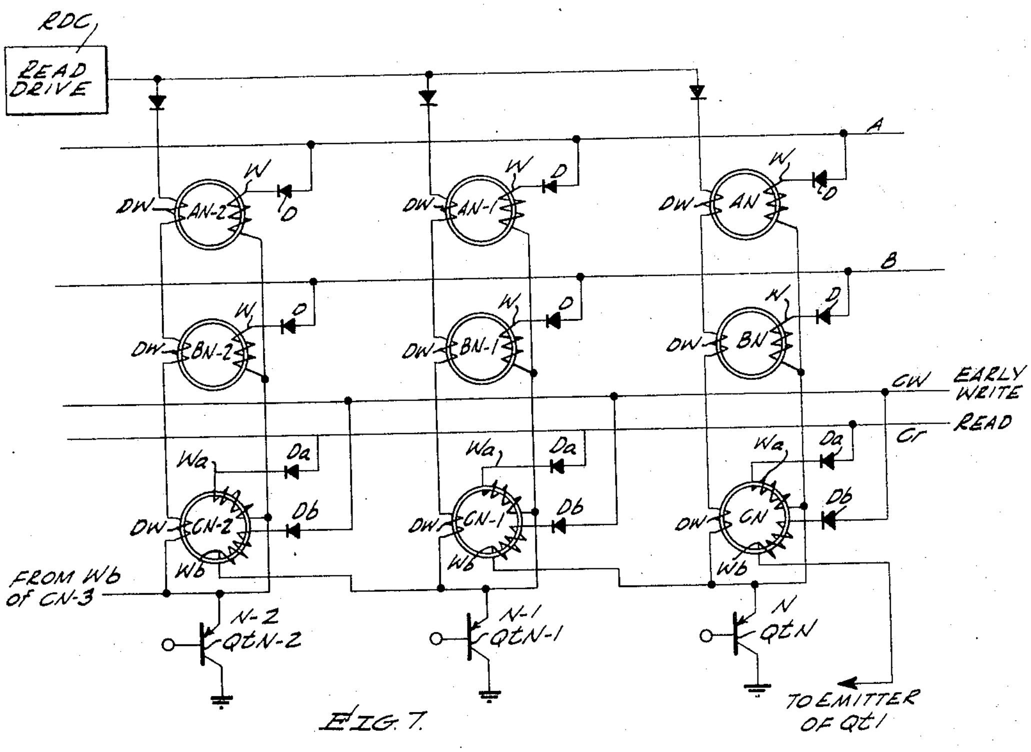
FIG. 7 illustrates a further modification of the invention of FIG. 1 and providing a left shift type of register operation.

A magnetic core conduit particularly arranged for providing left shift control of information in the magnetic cores is illustrated in FIG. 7. FIG. 7 schematically shows three bits each of two on-time magnetic core rows and three bits of a bit left shifted row of magnetic cores. In this illustration magnetic cores are numbered as indicated typically by the "A" row of cores in which the core A1 will be on the left and continuing through cores AN–2, AN–1 and AN. The cores indicated in row 2 are designated BN–2, BN–1 and BN. In row "C" the cores are designated CN–2, CN1 and CN. The switching transistors which are utilized to enable the core winding circuits in the respective columns are designated Q*t*N–2, Q*t*N–1 and Q*t*N. These are also PNP transistors of the type illustrated in FIG. 1, for instance. However, in this embodiment the emitters are connected to the core winding circuits and the collectors are grounded. The bases of these switching transistors will be controlled as described in connection with FIG. 1 and will be understood to be connected to the outputs of a suitable ring counter stepping switch or other suitable device to provide sequential switching of these transistors in a sequence Q*t*N–2, Q*t*N–1, etc. With this character of operation of the switching transistor information will be shifted in sequence from the cores on the left to the output circuits. The read-drive circuit RDC is coupled to the anodes of respective coupling diodes DN–2, DN–1 and DN which are connected in series in the respective drive winding circuits.

The polarities of the circuits illustrated in FIG. 7 are the opposite of those illustrated in FIG. 1, for instance, to show a different arrangement. Thus, signals such as illustrated in FIG. 3, in general, will be inverted for application in a circuit of the type in this figure. Thus, the output of the read-drive circuit RDC will now be a positive going signal, rather than a negative going signal, as earlier described. The "A" cores and the "B" cores may be the same as the cores described in connection with FIG. 1. The diodes in series with each of the read-write windings W on the cores in these two rows are reversed from the direction indicated in FIG. 1. Readout pulses are therefore negative going signals in the circuits A and B and write pulses or signals will therefore be positive going signals as distinguished from FIG. 1. Otherwise, the function of the magnetic core circuits of the "A" and "B" rows of cores is the same as that of FIG. 1 and will be understood from the explanations made in connection with FIG. 1, affording on-time operation in the handling of information signals. Core row "C" includes cores having single drive windings DW as before but provides separate read and write windings designated W*a* and W*b*, respectively. These winding circuits are repectively coupled to a read circuit C*r* by means of diodes D*a* and to an early write circuit C*w* by means of a diode D*b*. Each write winding W*b* is coupled to the switching transistor for the core column in which it appears, and as such produces a read pulse at such time as the column of cores of which it forms a part is pulsed. As before, winding W*b* may also be used to write information into that particular core, if this is desired, or simply to restore the core once it has been read.

The early write windings W*b* are coupled to the switching circuits of the following columns of cores, that is, the winding W*b* of core CN–2 is coupled to the switching circuit of the column of cores N–1. Likewise, the winding W*b* of core CN–1 is coupled to the switching circuit for the "N" column of cores. Winding W*a* of core CN is coupled back to the switching circuit of the first column of cores in the magnetic core array to complete the circuit. Thus, during an interval in which the core column N–1 is being read the application of write voltage to the circuit C*w* results in energization of winding W*b* on core CN–2. If a "1" is to be written this will be a positve going voltage which will be used to set the core CN–2 to its "1" magnetic state according to the convention herein adopted. Thus, on the next time around the information written into the core CN–2 during the time when the core column N–1 was being read will be read a bit time earlier, effectively achieving left shift.

Right shift operation may be obtained by reversing the direction in which the windings W*w* are connected from that shown herein.

Figure 8:
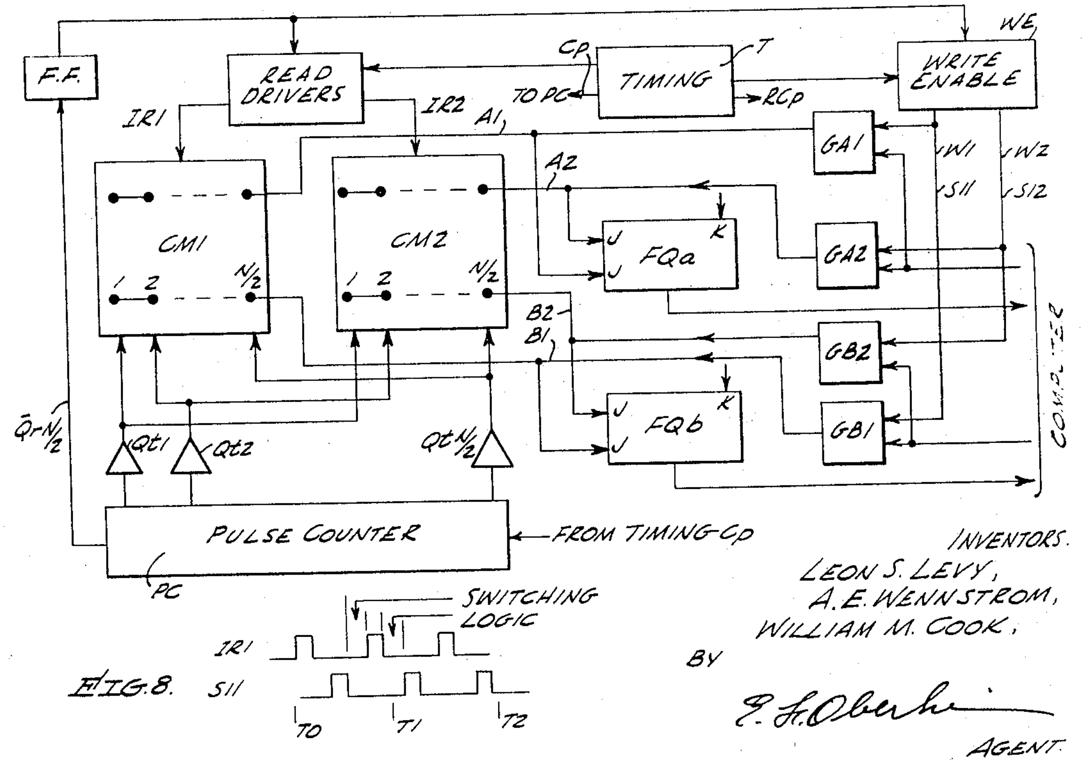
FIGS. 8 and 9 are block diagrams of memory systems folded in half vertically and folded in half horizontally, respectively.

A circuit of the type of FIG. 1 may be embodied in a memory organization which is effectively folded in half vertically. FIG. 8 shows such a physical arrangement employing respective core memory systems CM–1 and CM–2, each of which is a bit oriented sequential axis memory of the type of FIG. 1, for instance. No details of the core circuits are shown herein. The cores are represented by dots within the blocks shown and the dots are interconnected by lines to generally depict the core rows. Only two rows in each of the memories is indicated herein in the interest of simplicity. The cores are pulsed in columns as described in connection with FIG. 1 and to this end the pulse counter PC is shown controlling respective switches Q*t*1, Q*t*2 and Q*t* N/2. Corresponding columns of the respective core memories CM–1 and CM–2 are enabled in parallel by the switching circuits. To this end switching circuit Q*t*1 is coupled to column 1 of each of the core memories. Switching circuit Q*t*2 is coupled to column 2 of the core memories, and so on.

The read-drive circuit RDC has two output circuits, respectively designated IR1 and IR2. These circuits provide the pulses which pulse the columns of cores in the respective core memories, each functioning as described, for instance, in connection with FIG. 1. In this case the signals IR1 and IR2 are generated in sequence. First, the signal IR1 is employed to read out the core columns of core memory CM1. Thereafter, the signal IR2 is employed to read out the core columns of core memory CM2. To this end the pulse counter PC produces an output designated $\overline{Q}r$ N/2 with each full cycle which triggers a flip flop, generally designated FF. The output of the flip flop FF is coupled input-wise to the read-drive circuit RDC. The control of the read-drive circuit provided by the flip flop FF enables the production of the signal IR1 in synchronism with the clock pulse, when the flip flop FF is in one of its electrical states. When the counter PC completes a full cycle and produces an electrical signal indicating that cycle is completed, the flip flop FF is switched to its other electrical state. As the counter proceeds through another counting cycle the read-drive circuit now produces the signal IR2 which pulses the columns of cores of the core memory CM2.

The signal $\overline{Q}r$ N/2 may be applied to both flip flop inputs to cause switching with each signal occurrence. The Q and $\overline{Q}$ outputs of the flip flop may be used to gate the output pulses of the read-drive circuit to one core memory and then the other. Such circuits are conventional.

It will be noted that the pulse counter PC is provided with as many stages as there are cores in the rows indicated in the respective sections of the memory, the rows having half the number of cores as there are bits. The output of the pulse counter triggers transistors $Qt1$, $Qt2$ through $Qt$ N/2, here designated only in block form. The output signal $\overline{Q}r$ N/2, which indicates that the counter is in its highest count electrical configuration, may be utilized as it changes from its true electrical state to switch the flip flop FF. This may be a positive going or negative going signal as required by the particular circuits.

The input-output circuits of core memory CM1 are designated A1 and B1 and the corresponding input-output circuits of core memory CM2 are designated A2, B2. The input-output circuits A1, A2 are coupled input-wise to a flip flop $FQa$. This connection may be made to the J input terminal of the flip flop. The two connections may be suitably isolated by the application of conventional "or" gate diode circuits, as is well known in the art. A single output circuit is shown on the flip flop $FQa$ directed to the computer. Input-output circuits B1 and B2 are similarly coupled input-wise to the J input terminal of a flip flop $FQb$, also having a single output circuit directed to the computer. Flip flops $FQa$ and $FQb$ may be the same as illustrated in FIG. 2 from which the reference to the J input terminal will be understood.

Gates GA1, GA2, GB1 and GB2 are coupled to the respective input-output circuits A1, A2, B1 and B2. The function and construction of these gates may be the same as that described in connection with FIG. 1. Input information may be applied to the gates in pairs from the computer and the gates are controlled in corresponding pairs by signals derived from circuits S11 applied to gates GA1 and GB1 and signals S12 applied to gates GA2 and GB2. These signals or voltages may be referred to as write enable voltages and may be applied to the pull-down (or pull up) resistors of the gates. When so applied, these voltages correspond to the voltages, −10 v., illustrated on the pull-down resistors of the gates GA, GB and GC of FIG. 1 and take the place of the gate enabling voltage as applied in the gates of FIG. 1. Alternatively, the voltages S11 and S12 may be coupled to the gates as shown in FIG. 1.

The write enable circuit is controlled by the output voltages of the flip flop FF to energize the output circuit S11 when the flip flop is in one electrical state, and to energize the output circuit S12 when the flip flop is in its opposite electrical state. For the arrangement shown the circuit S11 will be enabled during the period in which the signals IR1 are produced and the circuit S12 will be enabled during the period in which the signals IR2 are produced.

FIG. 8 also shows the timing of signals IR1 and S11. Signal IR1 is delayed sufficiently to permit operation of switches $Qt1$, $Qt2$, etc. Signal S11 is delayed with respect to signal IR1 a period of time sufficient for logical operations to be performed. Thus, when flip flop FF is in its Q (or $\overline{Q}$) electrical state the signals IR1 and S11 are produced. When the flip flop FF is in its $\overline{Q}$ (or Q) electrical state the signals IR2 and S12 are produced. The write enable circuit WE may include two selectively enabled circuits of the type shown in FIG. 1, or may include a single circuit of that type having an output gated to circuit S11 or S12, depending upon the electrical state of the flip flop FF. Other conventional expedients may be employed.

The system is controlled by a timing circuit, generally designated T, producing clock pulses $C_p$. The clock pulses are applied to the read-drive circuit, to the write enable circuit and to the pulse counter to operate these circuits in synchronism with system timing.

With the arrangement described the operation of this system will be essentially the same as that described in connection with FIG. 1. The signals read out of the respective core memories CM1 and CM2 are utilized to control the respective flip flops $FQa$ and $FQb$ which are reset (not shown) as in FIG. 1 by pulses $RC_p$. As described, the periods of operation of the memories are separated by the production of the pulses IR1 and IR2 during different cycles of operation of the pulse counter. The gates GA1 through GB2 being enabled by signals S11 and S12, respectively, during respective periods of operation of the core memories are therefore utilized to restore the cores in the respective memories or to insert new information, depending upon the mode of operation which is desired.

This vertically folded memory organization reduces the number of flip flops and gates in the input-output circuits and reduces the size of the pulse counter.

Figure 9:
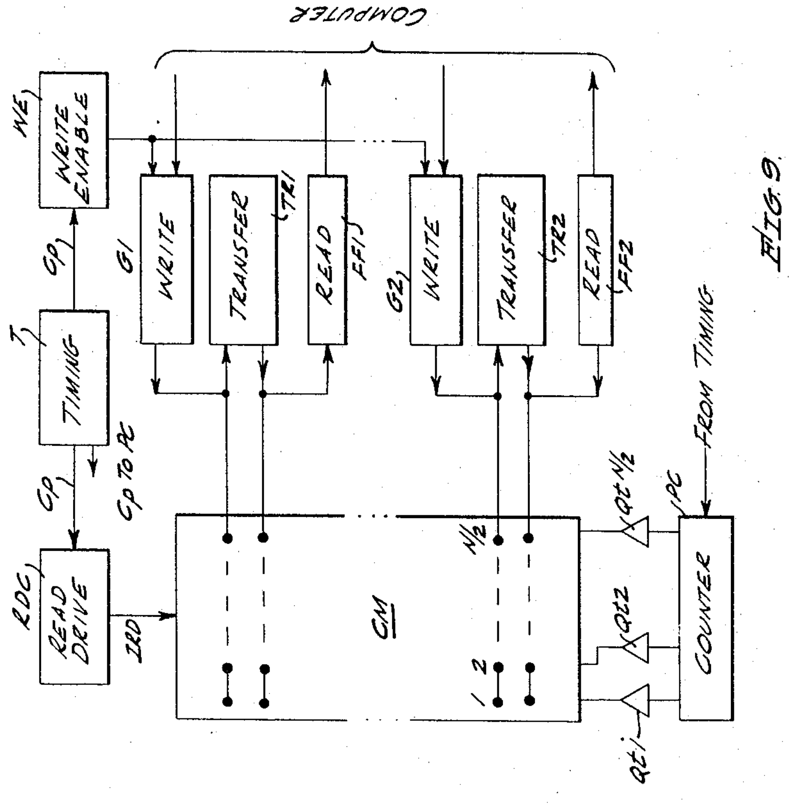

FIG. 9 illustrates a circuit incorporating a core memory of the type described in connection with FIG. 1 in which the memory is folded in half horizontally. As in the case of FIG. 8, the core memory herein is illustrated only in block form, the individual cores being shown as dots arranged in columns and rows and interconnected in rows by the lines indicated. This memory is used for storing a word of N bits length and is N/2 bits in length. This circuit incorporates the elementary principles of a circuit such as FIG. 5 in the use of transfer circuits such as TR1 and TR2 for taking information from one row of cores and inserting it in another or a following row of cores to thereby effectively lengthen the core row or core memory. The write gates are herein designated G1 and G2 and the read flip flops are designated FF1 and FF2. The respective transfer circuits which may be flip flops as indicated in FIG. 5, but which may be any other suitable type of circuit capable of receiving and transferring information from one core row to a second core row, are designated TR1 and TR2.

As in the case of FIG. 8, the pulse counter is capable of counting N/2 counts and again controls the switching transistors Qt1 through Qt N/2 to sequentially enable the winding circuits on the respective columns of cores. The timing circuit T, as in FIG. 8, produces clock pulses $C_p$ which control the read-drive circuit, the write enable circuit and the pulse counter to provide synchronous operation of these elements. The write enable circuit and the read-drive circuit in this instance may be exactly the same as described in connection with FIG. 1.

The write circuits G1 and G2 are connected to the input-output circuits of core rows from which information is being transferred and the read circuits are coupled to the input-output circuits of the core rows to which the information transfers are made. Thus, a particular core may be read and the information transferred therefrom by the transfer circuit connected thereto to a corresponding core of another core row. Thereafter, information may be restored or new information may be written into the core which has just been read. Reading may take place in the same or in a different cycle. These and other features will be apparent from an inspection of this circuit.

It will be seen that the use of a circuit of this type reduces the size and complexity of a counter circuit and associated circuits required to control the core memory.

Although any suitable type of magnetic core may be employed, the cores of one embodiment of this invention are molybdenum permalloy bobbin types of cores, each having a drive winding with a few turns of wire and 50 to 200 turns on the read-write windings. With a circuit arrangement of this type special read and write amplifiers are not ordinarily required, the transistor voltage and current levels being useable directly in setting of flip flops and in switching of cores.

Although several embodiments of this invention have been illustrated, it will be apparent to those skilled in the art that various modifications may be made in the subject matter herein disclosed as to the type of components which are employed, as to the polarity of circuit voltages and currents employed and as to the organization of such components, without departing from the spirit and scope of the invention. Accordingly, it is intended that the foregoing disclosure shall be considered only as illustrative of the principles of this invention and is not construed in a limiting sense.

What is claimed is:

1. A magnetic core circuit, comprising:
a plurality of magnetic cores arranged in columns and rows, each core having a drive winding and an electrically polarized read-write winding circuit;
respective enabling circuits, each including the drive windings of the respective columns of cores;
respective input-output circuits for each row of cores, each including the polarized read-write winding circuits of a row of magnetic cores, each read-write winding circuit being additionally coupled to the enabling circuit of the column of cores of which it is a part;
timing circuit means coupled to and sequentially operating said enabling circuits in predetermined time increments;
circuit means coupled to said input-output circuits and operated by output signals therefrom;
and gating means coupled to said input-output circuits for coupling magnetic core switching voltage into said input-output circuit.

2. A magnetic core circuit, comprising:
a plurality of magnetic cores arranged in columns and rows, each core having a drive winding and an electrically polarized read-write winding circuit;
respective enabling circuits, each including the drive windings of the respective columns of cores;
respective input-output circuits for each row of cores, each including the polarized read-write winding circuits of a row of magnetic cores, each read-write winding circuit being additionally coupled to the enabling circuit of the column of cores of which it is a part;
timing circuit means coupled to and sequentially operating said enabling circuits in predetermined time increments;
storage means coupled to said input-output circuits and operated by output signals therefrom;
and circuit means coupled to and controlled by said timing circuit means and coupled to said gating means for enabling said gating means before the end of each time increment.

3. A magnetic core circuit, comprising:
a plurality of magnetic cores arranged in columns and rows, each core having a drive winding and an electrically polarized read-write winding circuit;
a plurality of switch circuits, one for each column of cores;
drive winding circuit means coupling the drive windings of the cores of the respective columns to the respective switch circuits;
circuit means coupling the read-write winding circuits of the cores of the respective columns to the respective switch circuits;
an input-output circuit for each row of magnetic cores, each connected to the read-write winding circuits of that row of magnetic cores;
a storage device coupled to each input-output circuit;
an information input circuit coupled to each input-output circuit;
timing signal circuit means coupled to said switch circuits to operate said switch circuits in a particular sequence;
a pulse circuit coupled to and controlled by said timing signal circuit means and coupled to said drive winding circuit means to operate an enabled drive winding circuit means;
and control circuit means coupled to and controlled by said timing signal circuit means and coupled to and controlling each information input circuit.

4. A magnetic core circuit, comprising:
a plurality of magnetic cores arranged in columns and rows, each core having a drive winding and an electrically polarized read-write winding circuit;
respective enabling circuits, each including the drive windings of the respective columns of cores;
respective input-output circuits for each row of cores, each including the polarized read-write winding circuits of a row of magnetic cores, each read-write winding circuit being additionally coupled to the enabling circuit of the column of cores of which it is a part;
timing signal circuit means coupled to and sequentially operating said enabling circuits in predetermined time increments;
resettable storage means coupled to said input-output circuits and operated by output signals therefrom;
gating means coupled to said input-output circuits for coupling magnetic core switching energy into said input-output circuits;
control means coupled to and controlled by said timing circuit means and coupled to said gating means for enabling said gating means before the end of each time increment;
and a reset signal circuit coupled to and controlled by said timing signal circuit means and coupled to said resettable storage means for resetting said resettable storage means.

5. Apparatus as set forth in claim 4 in which said resettable storage means is a flip flop.

6. Apparatus as set forth in claim 4 in which said control means comprises a multivibrator.

7. Apparatus as set forth in claim 4 in which said gating means couples magnetic core switching current into said input-output circuits of opposite polarity to said output signals.

8. A magnetic core circuit, comprising:
a plurality of magnetic cores arranged in columns and rows, each core having a pair of windings, one of which is electrically polarized;
an input-output circuit for each row of cores;
respective switching circuits for each column of cores;
means connecting said polarized windings of each column of cores between the switching circuit for that column of cores and the input-output circuit for that row of cores;

means connecting the remaining winding on each core in said columns to the switching circuit for that column of cores;

respective output signal receiving circuits coupled to each input-output circuit to receive output signals therefrom;

and respective input signal circuits coupled to said input-output circuits to apply input signals thereto when no output signals are present.

9. A magnetic core circuit, comprising:

a plurality of magnetic cores arranged in columns and rows, each core having a pair of windings, one of which is electrically polarized;

an input-output circuit for each row of cores;

respective switching circuits for each column of cores;

means connecting said polarized windings of each column of cores between the switching circuit for the column of cores and the input-output circuit for that row of cores;

means connecting the remaining winding on each core in said columns to the switching circuit for that column of cores;

respective output signal receiving circuits coupled to said input-output circuits to receive output signals of one polarity therefrom;

and respective input signal circuits coupled to said input-output circuits to apply input signals thereto of a polarity opposite to said output signals when no output signals are present.

10. A magnetic core circuit, comprising:

a plurality of magnetic cores arranged in columns and rows, each core having a pair of windings, one of which is electrically polarized;

respective input-output circuits coupled to said electrically polarized windings of each row of cores;

respective switching circuits for each column of cores coupled to both windings on each core of the respective columns;

respective output signal receiving circuits coupled to said input-output circuits to receive output signals therefrom;

and respective input signal circuits coupled to said input-output signal circuits to apply input signals thereto when no output signals are present.

11. A magnetic core circuit, comprising:

a plurality of magnetic cores arranged in columns and rows, each core having a drive winding an an electrically polarized read-write winding circuit;

respective enabling circuits, each including the drive windings of the respective columns of cores;

respective input-output circuits for each row of cores, each including the polarized read-write winding circuits of a row of magnetic cores, each read-write winding circuit being additionally coupled to the enabling circuit of the column of cores of which it is a part;

timing signal circuit means coupled to and sequentially operating said enabling circuits in predetermined time increments;

input circuit means coupled to each input-output circuit;

and circuit means coupling one input-output circuit to an input circuit means coupled to a different input-output circuit.

12. Apparatus as set forth in claim 11 in which said last named circuit means comprises a flip flop.

13. A magnetic core circuit, comprising:

a plurality of magnetic cores arranged in columns and rows, each core having a pair of drive windings and a pair of polarized winding circuits;

a pair of input-output circuits for each row of cores;

respective switching circuits for each column of cores;

means connecting one polarized winding circuit of each core to said switching circuit for that column of cores and to one of the input-output circuits for that row of cores;

means connecting one drive winding of each core to the switching circuit for that column of cores;

means connecting the remaining drive winding and the remaining polarized winding circuit of each core to a switching circuit for a different column of cores and connecting said remaining drive winding of each core to the remaining input-output circuit for that row of cores;

and means coupled to said drive windings for applying electrical pulses thereto.

14. A magnetic core circuit, comprising:

a plurality of magnetic cores arranged in columns and rows, each core having a polarized write winding circuit, a polarized read winding circuit and a drive winding;

an output circuit for each row of cores coupled to the read winding circuit of that row of cores;

an input circuit for each row of cores coupled to the write windings of that row of cores;

means coupling each read winding circuit of said cores to the switching circuit for that column of cores;

means coupling each write winding circuit of said cores to a switching circuit for a different column of cores;

a drive winding circuit for each column of cores coupled to the drive windings for that column of cores;

a switching circuit coupled to each drive winding circuit and sequentially enabling said drive winding circuits;

and means coupled to said drive winding circuits for coupling drive signals thereto.

15. Apparatus as set forth in claim 14 which each write winding circuit of the cores in one column is connected to the switching circuit for the column of cores which is next in sequence.

16. A magnetic core circuit, comprising:

a pair of magnetic core memories each having a plurality of magnetic cores arranged in columns and rows, each core having a pair of windings, one of which is electrically polarized;

an input-output circuit for each row of cores of each memory;

respective switching circuits for corresponding columns of cores of each memory;

means connecting said polarized windings of each column of cores of each memory between the switching circuit for that column of cores and the input-output circuit for that row of cores;

means connecting the remaining winding on each core in said columns of each memory to the switching circuit for that column of cores;

respective output signal receiving circuits coupled to corresponding input-output circuits of each memory to receive output singals of one polarity therefrom;

and respective input signal circuits coupled to respective input-output circuits of said memories to apply input signals thereto of a polarity opposite to said output signals when no output signals are present.

17. A magnetic core circuit, comprising:

a pair of magnetic core memories each having a plurality of magnetic cores arranged in columns and rows, each core having a pair of windings, one of which is electrically polarized;

an input-output circuit for each row of cores of each memory;

respective switching circuits for corresponding columns of cores of each memory;

means connecting said polarized windings of each column of cores of each memory between the switching circuit for that column of cores and the input-output circuit for that row of cores;

means connecting the remaining winding on each core in said columns of each memory to the switching circuit for that column of cores;

respective output signal receiving circuits coupled to corresponding input-output circuits of each memory to receive output signals of one polarity therefrom;

respective input signal circuits coupled to respective input-output circuits of said memories to apply input signals thereto of a polarity opposite to said output signals when no output signals are present;

means coupled to said switching circuits for sequentially actuating said switching circuits;

and means coupled to said last named means and controlled thereby and coupled to said memories for sequentially operating said memories.

18. A magnetic core circuit, comprising:

a plurality of magnetic cores arranged in columns and rows, each core having a pair of windings, one of which is electrically polarized;

respective input-output circuits coupled to said electrically polarized windings of each row of cores;

respective switching circuits for each column of cores coupled to both windings on each core of the respective columns;

transfer signal circuits copuled to selected pairs of input-output circuits to transfer signals put out by one input-output circuit as input to the other input-output circuit;

and a write circuit coupled to that input-output circuit from which information is transferred.

19. A magnetic core circuit, comprising:

a plurality of magnetic cores arranged in columns and rows, each core having a pair of windings, one of which is electrically polarized;

respective input-output circuits coupled to said electrically polarized windings of each row of cores;

respective switching circuits for each column of cores coupled to both windings on each core of the respective columns;

transfer signal circuits coupled to selected pairs of input-output circuits to transfer signals put out by one input output circuit as input to the outer input output circuit;

a write circuit coupled to that input-output circuit from which information is transferred;

and a read circuit coupled to that input-output circuit to which information is transferred.

20. A magnetic core circuit, comprising:

a plurality of magnetic cores arranged in columns and rows, each core having a pair of windings, one of which is electrically polarized;

respective input-output circuits coupled to said electrically polarized windings of each row of cores;

respective switching circuits for each column of cores coupled to both windings on each core of the respective columns;

transfer signal circuits coupled to selected pairs of input-output circuits to transfer signals put out by one input output circuit as input to the other input output circuit;

a write circuit coupled to that input-output circuit from which information is transferred;

a read circuit coupled to that input-output circuit to which information is transferred;

and write enabling circuit means coupled to said write circuit.

No references cited.

JAMES W. MOFFITT, *Acting Primary Examiner.*

T. W. FEARS, *Assistant Examiner.*

UNITED STATES PATENT OFFICE

CERTIFICATE OF CORRECTION

Patent No. 3,296,603 January 3, 1967

Leon S. Levy et al.

It is hereby certified that error appears in the above numbered patent requiring correction and that the said Letters Patent should read as corrected below.

Column 1, line 63, for "read-wire" read -- read-write --; line 68, for "or", first occurrence, read -- of --; column 7, line 22, for Q1" read -- Qf1 --; column 16, line 33, after "claim 14" insert -- in --.

Signed and sealed this 25th day of June 1968.

(SEAL)
Attest:

Edward M. Fletcher, Jr.
Attesting Officer

EDWARD J. BRENNER
Commissioner of Patents